US009781672B2

(12) United States Patent
Song et al.

(10) Patent No.: US 9,781,672 B2
(45) Date of Patent: Oct. 3, 2017

(54) APPARATUS AND METHOD FOR PROCESSING SIGNAL FOR D2D COMMUNICATION IN WIRELESS COMMUNICATION SYSTEM

(71) Applicant: Samsung Electronics Co., Ltd., Suwon-si, Gyeonggi-do (KR)

(72) Inventors: Seong-Wook Song, Seoul (KR); Hyung-Jong Kim, Seongnam-si (KR); Jong-Han Lim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 349 days.

(21) Appl. No.: 14/307,914

(22) Filed: Jun. 18, 2014

(65) Prior Publication Data
US 2015/0119021 A1 Apr. 30, 2015

(30) Foreign Application Priority Data

Oct. 31, 2013 (KR) .................. 10-2013-0130918

(51) Int. Cl.
*H03H 7/12* (2006.01)
*H04W 52/02* (2009.01)
*H04W 88/06* (2009.01)
*H04L 1/00* (2006.01)
*H04W 72/00* (2009.01)
*H04W 72/04* (2009.01)
(Continued)

(52) U.S. Cl.
CPC .......... *H04W 52/0229* (2013.01); *H04L 1/00* (2013.01); *H04W 72/00* (2013.01); *H04W 72/04* (2013.01); *H04W 88/04* (2013.01); *H04W 88/06* (2013.01); *H04W 92/18* (2013.01); *Y02B 60/50* (2013.01)

(58) Field of Classification Search
None
See application file for complete search history.

(56) References Cited

U.S. PATENT DOCUMENTS 8,775,846 B2 * 7/2014 Robinson ................ G06F 1/263
323/318
2011/0255425 A1 * 10/2011 Pikkarainen .......... H04W 48/08
370/252
2012/0129540 A1 5/2012 Hakola et al.
(Continued)

FOREIGN PATENT DOCUMENTS

KR 1020090092420 A 9/2009
KR 1020120074254 A 7/2012

OTHER PUBLICATIONS

Xingqin Lin et al., "A Comprehensive Framework for Device-to-Device Communications in Cellular Networks", University of Teramo, May 2013.

*Primary Examiner* — Daniel Lai
*Assistant Examiner* — Frank Donado
(74) *Attorney, Agent, or Firm* — Jefferson IP Law, LLP

(57) ABSTRACT

An apparatus of a transmitter for signal processing in a wireless communication system is provided. The apparatus includes a first signal processing module set configured to process a first signal transmitted to a base station and a second signal processing module set configured to process a second signal transmitted to a terminal, wherein the first signal processed by the first signal processing module set has a different bandwidth than the second signal processed by the second signal processing module set.

26 Claims, 15 Drawing Sheets

(51) Int. Cl.
*H04W 88/04* (2009.01)
*H04W 92/18* (2009.01)

(56) References Cited

U.S. PATENT DOCUMENTS

| | | | |
|---|---|---|---|
| 2013/0230032 A1 | 9/2013 | Lu et al. | |
| 2013/0322276 A1* | 12/2013 | Pelletier | H04W 72/085 370/252 |
| 2013/0324182 A1* | 12/2013 | Deng | H04W 52/281 455/522 |
| 2014/0023008 A1 | 1/2014 | Ahn et al. | |
| 2015/0016410 A1* | 1/2015 | Lee | H04L 1/18 370/330 |
| 2015/0016428 A1* | 1/2015 | Narasimha | H04L 5/0058 370/336 |
| 2015/0111586 A1* | 4/2015 | Sorrentino | H04W 72/042 455/450 |
| 2015/0146633 A1* | 5/2015 | Kalhan | H04L 1/1607 370/329 |
| 2015/0289307 A1* | 10/2015 | Li | H04W 8/005 370/329 |
| 2016/0021526 A1* | 1/2016 | Niu | H04W 74/02 370/230 |

* cited by examiner

APPARATUS AND METHOD FOR PROCESSING SIGNAL FOR D2D COMMUNICATION IN WIRELESS COMMUNICATION SYSTEM

CROSS-REFERENCE TO RELATED APPLICATION(S)

This application claims the benefit under 35 U.S.C. §119(a) of a Korean patent application filed on Oct. 31, 2013 in the Korean Intellectual Property Office and assigned Serial number 10-2013-0130918, the entire disclosure of which is hereby incorporated by reference.

TECHNICAL FIELD

The present disclosure relates generally to signal processing in a wireless communication system.

BACKGROUND

Device to Device (D2D) communication indicates direct signal transmission and reception between terminals without passing through a base station. That is, the D2D communication allows the communication between the adjacent terminals using a standard or a resource allocated by the base station without passing the base station. The D2D communication is contrasted with cellular communication. The cellular communication includes communication between the base station and the terminal and is referred to as Device to Base Station (D2B) or Base Station to Device (B2D) communication.

FIG. 1 illustrates D2D communication in a cellular network according to the related art.

Referring to FIG. 1, a User Equipment 1 (UE1) 121 and a UE2 122 are paired for their D2D communication and concurrently connected to a Base Station (BS) 110. The UE1 121 and the UE2 122 paired for the D2D communication are connected to the BS 110 through a first D2B connection and a second D2B connection respectively, and concurrently establish the D2D connection between them. Hence, the UE1 121 and the UE2 122 can communicate with the BS 110 to use a service requiring an external network, and communicate with each other directly using the D2D connection to exchange data between them, rather than transmitting the data over the existing cellular network.

The single UE can hold both of the D2D connection and the D2B connection as shown in FIG. 1. In this case, the UE needs to process both of the D2D communication signal and the D2B communication signal. Further, the UE needs to process only the D2D signal in the D2D communication, and only the D2B signal in the D2B communication. In so doing, efficiency of current consumption and cost increase for the signal processing depends on configuration of a transmitter and a receiver for processing the D2D signal and the D2B signal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure to provide an apparatus and a method for processing a signal for Device to Device (D2D) communication in a wireless communication system.

Another aspect of the present disclosure is to provide an apparatus and a method for reducing current consumption for D2D communication in a wireless communication system.

Yet another aspect of the present disclosure is to provide an apparatus and a method for minimizing terminal complexity which may increase if processing a plurality of signals in a wireless communication system.

In accordance with an aspect of the present disclosure, an apparatus of a transmitter in a wireless communication system is provided. The apparatus includes a first signal processing module set configured to process a first signal transmitted to a base station, and a second signal processing module set configured to process a second signal transmitted to a terminal. The first signal processed by the first signal processing module set has a different bandwidth than the second signal processed by the second signal processing module set.

In accordance with another aspect of the present disclosure, an apparatus of a receiver in a wireless communication system is provided. The apparatus includes a first signal processing module set configured to process a first signal received from a base station, and a second signal processing module set configured to process a second signal received from a terminal. The first signal processed by the first signal processing module set has a different bandwidth than the second signal processed by the second signal processing module set.

In accordance with yet another aspect of the present disclosure, an apparatus for allocating a resource in a wireless communication system is provided. The apparatus includes a controller configured to allocate the resource to carry a signal from a first terminal to a second terminal, and the resource is allocated for a bandwidth below another system bandwidth defined by a standard adopted by a cellular system other than a system bandwidth of the cellular system of a base station.

In accordance with still another aspect of the present disclosure, a method for operating a transmitter in a wireless communication system is provided. The method includes processing a first signal transmitted to a base station using a first signal processing module set, and processing a second signal transmitted to a terminal using a second signal processing module set. The first signal processed by the first signal processing module set has a different bandwidth than the second signal processed by the second signal processing module set.

In accordance with aspect of the present disclosure, a method for operating a receiver in a wireless communication system is provided. The method includes processing a first signal received from a base station using a first signal processing module set, and processing a second signal received from a terminal using a second signal processing module set. The first signal processed by the first signal processing module set has a different bandwidth than the second signal processed by the second signal processing module set.

In accordance with another aspect of the present disclosure, a method for allocating a resource in a wireless communication system is provided. The method includes allocating the resource to carry a signal from a first terminal to a second terminal, and the resource is allocated for a bandwidth below another system bandwidth defined by a standard adopted by a cellular system other than a system bandwidth of the cellular system of a base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
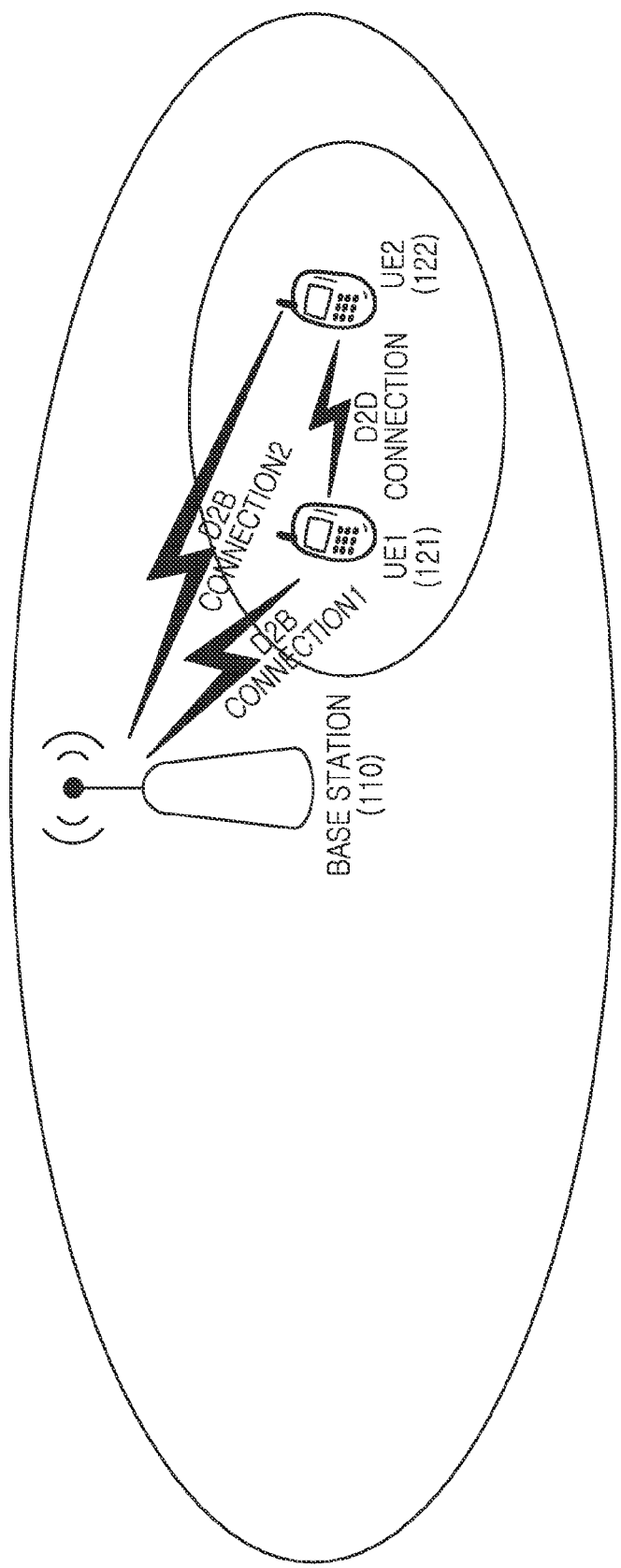
FIG. 1 illustrates D2D communication in a cellular network according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure provide a technique for processing a signal for Device to Device (D2D) communication in a wireless communication system.

Terms describing information for identifying objects of interest, and terms for configuring beam information are used herein to ease the understanding. Accordingly, such terms are not intended to limit the present disclosure, and other terms indicating the object of technically identical meaning can be used. For example, while a 'terminal' is used to indicate a communication device of a user, the 'terminal' can be referred to as a Mobile Station (MS), a Mobile Terminal (MT), a User Equipment (UE), and the like.

Hereafter, for the sake of understanding, the present disclosure adopts terms and names defined in $3^{rd}$ Generation Partnership Project (3GPP) Long Term Evolution (LTE). Yet, the present disclosure is not limited to the terms and the names, and is equally applicable to other-standard systems.

According to various embodiments of the present disclosure, the terminal can perform D2B communication and D2D communication. A resource used for the D2D communication can be allocated within a D2B communication band. For example, the resource can be allocated as shown in FIG. 2.

Figure 2:
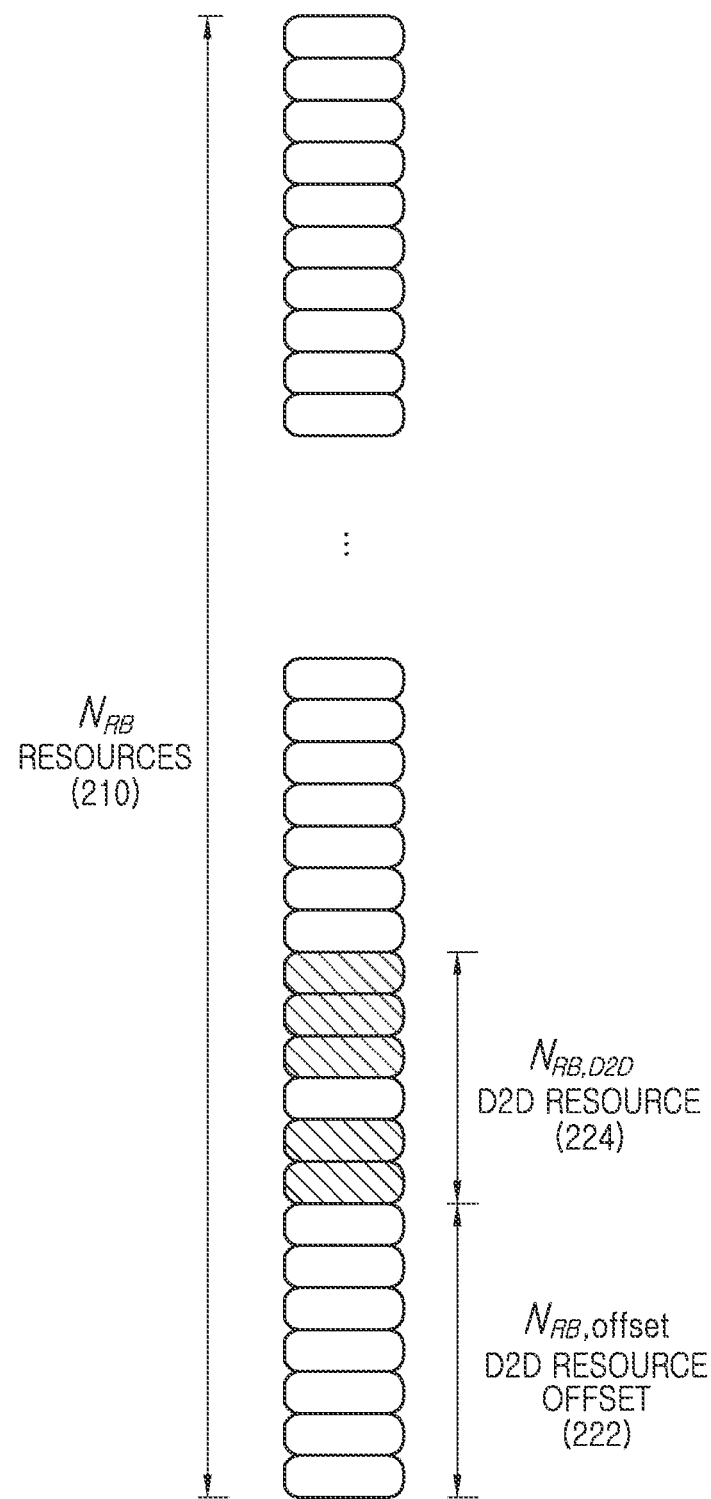
FIG. 2 illustrates resource allocation in a wireless communication system according to an embodiment of the present disclosure.

FIG. 2 illustrates resource allocation in a wireless communication system according to an embodiment of the present disclosure.

Referring to FIG. 2, a plurality of resource blocks divided on a frequency axis is depicted and the entire bandwidth for the D2B communication includes $N_{RB}$-ary resources 210. In FIG. 2, a D2D resource offset 422 indicates a start offset of a resource block region allocated for the D2D communication, and a D2D resource 424 indicates a resource block region allocated for the D2D communication. That is, some $N_{RB,D2D}$-ary resource blocks of the $N_{RB}$-ary resources 210 can be allocated for the D2D communication. As shown in FIG. 2, when some of wideband resources of a base station are allocated for the D2D communication, the D2D communication can be fulfilled using the existing wideband transmitter and receiver. Hence, an increase of additional terminal complexity in the D2D communication can be reduced.

When the resources for the D2D communication are allocated as shown in FIG. 2 and a separate signal processing module for processing the D2D communication signal is absent, the signal for the D2D communication and the signal for the D2B communication are processed together. To ease the understanding, the signal for the D2D communication is referred to as a D2D signal and the signal for the D2B communication is referred to as a D2B signal.

A terminal for transmitting the signal can map the D2D signal and the D2B signal to the allocated resource blocks, and then process the signals using a module which processes the wideband signal corresponding to a cellular communication bandwidth. For example, the transmit signal including the D2D signal and the D2B signal can go through analog conversion, band pass filtering, and so on. Similarly, a terminal receiving the signal can process the wideband receive signal including the D2D signal and the D2B signal using a module which processes the wideband signal corresponding to the cellular communication bandwidth. For example, the receive signal can go through band pass filtering, digital conversion, and so on.

However, when the module for processing the wideband signal processes the D2D signal, unnecessary current is consumed. For example, when the terminal transmits only the D2D signal without the D2B signal, unnecessary current consumption is caused. As shown in FIG. 2, the resource for the D2D communication can occupy only part of the entire bandwidth. However, without a separate module for processing the D2D signal, the module for processing the wideband signal operates to process the D2D signal which merely occupies part of the whole bandwidth. For example, when the whole bandwidth is 20 MHz and only 6 of 100 resource blocks are allocated for the D2D communication, a Wideband (WB)-Digital to Analog Converter (DAC) and a WB-analog baseband processing module operate to process the wideband signal which occupies 100 resource blocks.

Since an electronic circuit for the signal processing includes capacitance and inductance, circuit impedance changes according to a frequency of the signal to input or to output. To process the wideband signal, the module, such as a DAC, needs to operate at a higher frequency than the narrowband signal processing. For example, the wider bandwidth of the signal to process, the higher sampling frequency the DAC needs. As the needed frequency gets higher, the impedance changes to consume more current. That is, the module for processing the wideband signal consumes far more current than a module for processing the narrowband signal.

In conclusion, although the D2D signal is the narrowband signal compared to the whole bandwidth, the modules for processing the wideband signal can cause the unnecessary current consumption in the D2D signal processing. Thus, the present disclosure provides a transmitter of FIG. 3 and a receiver of FIG. 4.

Figure 3:
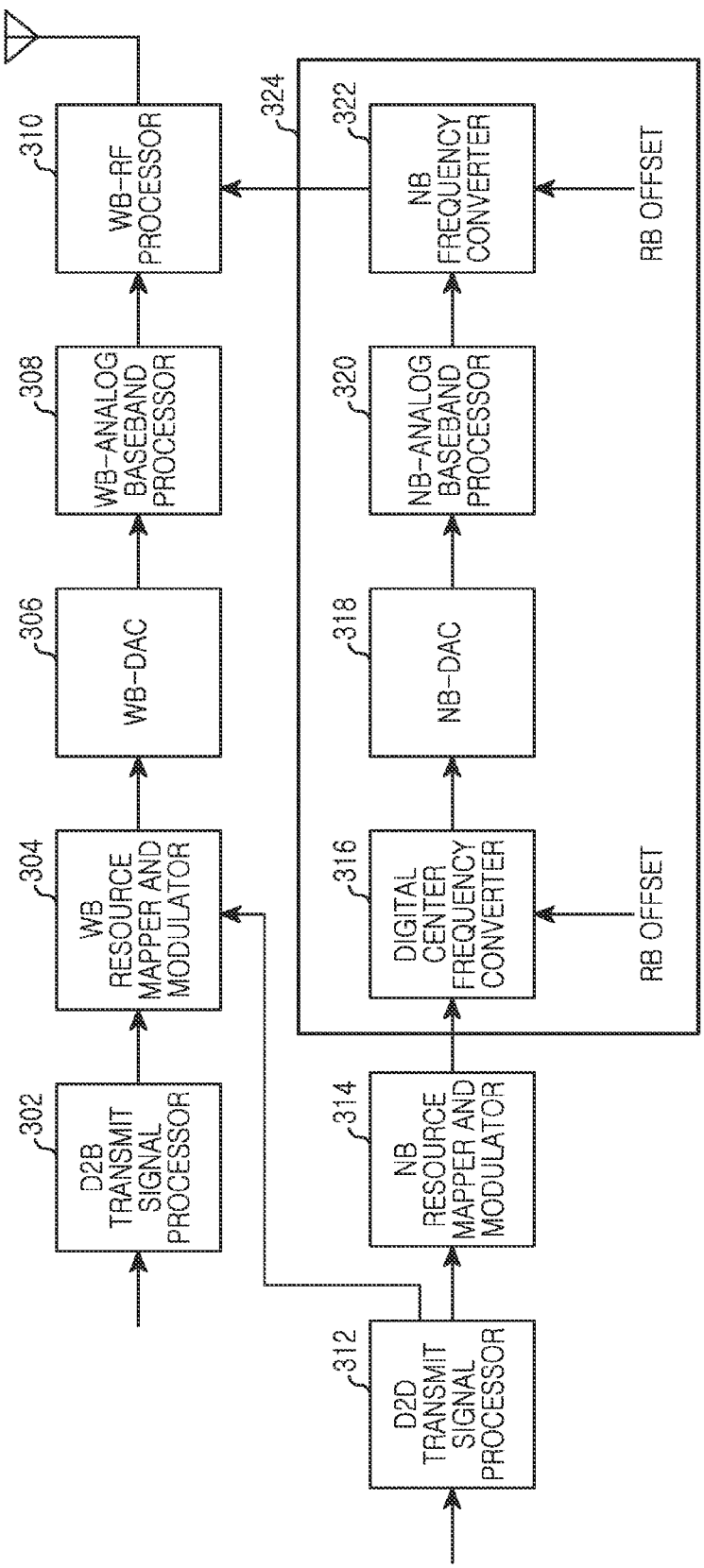
FIG. 3 illustrates a transmitter in a wireless communication system according to an embodiment of the present disclosure.

FIG. 3 illustrates a transmitter in a wireless communication system according to an embodiment of the present disclosure.

Referring to FIG. 3, the transmitter includes a D2B transmit signal processor 302, a WB-resource mapper and modulator 304, a WB-DAC 306, a WB-analog baseband processor 308, a WB-Radio Frequency (RF) processor 310, a D2D transmit signal processor 312, a Narrowband (NB)-resource mapper and modulator 314, a digital center frequency converter 316, an NB-DAC 318, an NB-analog baseband processor 320, and an NB-analog baseband center frequency converter 322. The digital center frequency converter 316, the NB-DAC 318, the NB-analog baseband processor 320, and the NB-analog baseband center frequency converter 322 can be collectively referred to as a narrowband waveform generator 324.

The D2B transmit signal processor 302 encodes and modulates D2B data. That is, the D2B transmit signal processor 302 encodes the D2B data and generates complex symbols using M-ary mapping.

The WB-resource mapper and modulator 304 maps the complex symbols fed from the D2B transmit signal processor 302 to the corresponding resource blocks, and modulates them to Single Carrier (SC)-Frequency Division Multiple Access (FDMA) symbols or Orthogonal Frequency Division Multiplexing (OFDM) symbols. For example, the OFDM symbol can be generated using Inverse Fast Fourier Transform (IFFT), and the SC-FDMA symbol can be generated using Fast Fourier Transform (FFT) and IFFT.

When the transmitter transmits the D2D signal and the D2B signal at the same time, that is, in the same time interval, the WB-resource mapper and modulator 304 can process all the complex symbols fed from the D2B transmit signal processor 302 and the D2D transmit signal processor 312. That is, the output of the WB-resource mapper and modulator 304 can be the wideband signal including the resources carrying the D2D signal and the D2B signal. That is, when transmitting both of the D2D signal and the D2B signal, the transmitter uses only the modules for processing the wideband signal without operating the narrowband waveform generator 324, thus avoiding the current consumption of the narrowband waveform generator 324.

Alternatively, when transmitting both of the D2D signal and the D2B signal, the transmitter can process the D2D signal using the narrowband waveform generator 324. In other words, regardless of the simultaneous transmission with the D2B signal, the transmitter can process the D2D signal using the modules for processing the narrowband signal, for example, using the narrowband waveform generator 324.

Alternatively, when transmitting both of the D2D signal and the D2B signal, the transmitter can process the D2D signal and the D2B signal through separate transmit paths according to a predefined condition, or process the D2D signal and the D2B signal through separate transmit paths. For example, the predefined condition can be defined based on a signal strength or transmit power difference between the D2D signal and the D2B signal. For example, when the transmit power difference between the D2D signal and the D2B signal exceeds a threshold, the transmitter can process the D2D signal and the D2B signal in a separate transmit path. By contrast, when the transmit power difference between the D2D signal and the D2B signal falls below the threshold, the transmitter can process the D2D signal and the D2B signal in the single path, that is, using the modules for processing the wideband signal.

The WB-DAC 306 converts the modulated wideband digital-domain signal to an analog baseband signal. For example, the WB-DAC 306 can convert the digital signal, sampled at the frequency corresponding to two times of the bandwidth of the wideband digital domain signal, to an analog signal.

The WB-analog baseband processor 308 enhances signal quality output from the WB-DAC 306. For example, the WB-analog baseband processor 308 can perform Adjacent Channel Leakage Ratio (ACLR) filtering, Direct Current (DC) offset control, and I/Q imbalance compensation.

The WB-RF processor 310 up-converts the analog baseband signal into a carrier frequency and then transmits the carrier frequency signal via an antenna. Further, the WB-RF processor 310 can amplify the baseband signal or the carrier frequency signal.

The D2D transmit signal processor 312 encodes and modulates D2B data. That is, the D2D transmit signal processor 312 encodes the D2D data and generates the complex symbols using the M-ary mapping.

The NB-resource mapper and modulator 314 maps the complex symbols fed from the D2D transmit signal processor 312 to the corresponding resource blocks, and modulates the complex symbols to generate SC-FDMA symbols or OFDM symbols. For example, the OFDM symbol can be generated using the IFFT, and the SC-FDMA symbol can be generated using the FFT and the IFFT. The output of the NB-resource mapper and modulator 314 is the narrowband signal including only the D2D signal.

The digital center frequency converter 316 converts the frequency such that the center frequency of the signal fed from the NB-resource mapper and modulator 314 is placed at the DC. For doing so, the digital center frequency converter 316 can shift the center frequency of the baseband D2D signal to the DC, based on the resource block offset of the resource block allocated for the D2D communication. Since the frequency conversion makes the baseband D2D signal the narrowband signal based on the DC, the narrowband processing is feasible.

The NB-DAC 318 converts the narrowband D2D signal of the shifted frequency to an analog signal. For example, the NB-DAC 318 can convert the digital signal sampled at the frequency corresponding to two times of the bandwidth of the narrowband D2D signal, to the analog signal.

The NB-analog baseband processor 320 enhances signal quality of the baseband D2D signal. For example, the NB-analog baseband processor 320 can perform the band pass filtering using an analog filter corresponding to the bandwidth of the D2D signal, the DC offset control, and the I/Q imbalance compensation.

The NB-analog baseband center frequency converter 322 shifts the baseband D2D signal to the frequency corresponding to the resource block allocated for the D2D communication. That is, the NB-analog baseband center frequency converter 322 re-shifts the signal frequency-shifted to the DC by the digital center frequency converter 316, to the original location on the frequency. For doing, the NB-analog baseband center frequency converter 322 can shift the baseband D2D signal to the allocated D2D resource region by applying the resource block offset of the resource block allocated for the D2D communication.

Although it is not depicted in FIG. 3, the transmitter can further include a controller for selecting the signal processing path based on the type of the transmit signal, controlling the modules of the selected path, and providing the RF offset. The controller can include at least one Digital Signal Processor (DSP).

Referring to FIG. 3, the D2D transmit signal processor 312, the NB-resource mapper and modulator 314, the digital center frequency converter 316, the NB-DAC 318, the NB-analog baseband processor 320, and the NB-analog baseband center frequency converter 322 process only the D2D signal. However, part of the D2D transmit signal processor 312, the NB-resource mapper and modulator 314, the NB-DAC 318, and the NB-analog baseband processor 320 can be omitted, and the function of the omitted block can be conducted by the module for the D2B signal.

Figure 4:
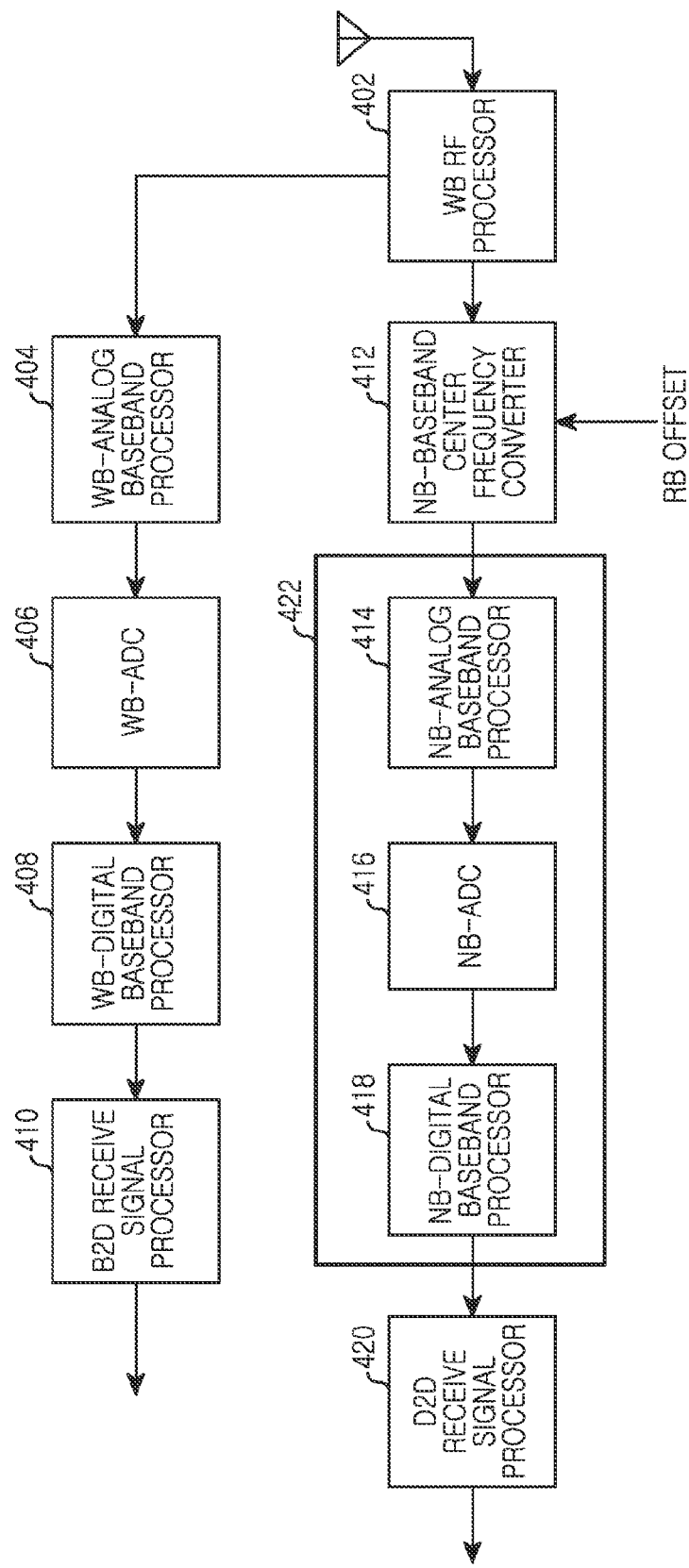
FIG. 4 illustrates a receiver in a wireless communication system according to an embodiment of the present disclosure.

FIG. 4 illustrates a receiver in a wireless communication system according to an embodiment of the present disclosure.

Referring to FIG. 4, the receiver includes a WB-RF processor 402, a WB-analog baseband processor 404, a WB-ADC 406, a WB-digital baseband processor 408, a B2D receive signal processor 410, a NB-baseband center frequency converter 412, an NB-analog baseband processor 414, an NB-ADC 416, an NB-digital baseband processor 418, and a D2D receive signal processor 420. The NB-analog baseband processor 414, the NB-ADC 416, and the NB-digital baseband processor 418 can be collectively referred to as a narrowband processor 422.

The WB-RF processor 402 selects the signal of the intended band from the RF signal received via an antenna and cancels noise. For example, the WB-RF processor 402 can include a band pass filter (not shown) and a Low Noise Amplifier (LNA) (not shown). The signal output from the WB-RF processor 402 is the wideband signal. When the receiver receives the D2D signal, the WB-RF processor 402 provides the wideband signal to the NB-baseband center frequency converter 412. When the receiver receives the B2D signal, the WB-RF processor 402 provides the wideband signal to the WB-analog baseband processor 404.

The WB-analog baseband processor 404 enhances the signal quality according to the bandwidth of the wideband signal. For example, the WB-analog baseband processor 404 can perform analog filtering for eliminating a neighboring channel, the DC offset control, and the I/O imbalance compensation.

The WB-ADC 406 samples and converts the wideband analog signal to the digital signal. For example, the WB-ADC 406 can sample the wideband analog signal at a frequency corresponding to two times of the bandwidth of the wideband signal.

The WB-digital baseband processor 408 demodulates the SC-OFDM symbol or the OFDM symbol and extracts the complex symbols mapped to the resource blocks. That is, the WB-digital baseband processor 408 demodulates the SC-OFDM symbol or the OFDM symbol, that is, converts the symbol to the complex symbols of the frequency axis according to a modulation scheme of the SC-OFDM symbol or the OFDM symbol generated by the transmitter. In so doing, the WB-digital baseband processor 408 extracts the signals mapped to the resource blocks allocated to the receiver.

The B2D receive signal processor 410 demodulates and decodes the B2D signal. That is, the B2D receive signal processor 410 can convert the complex symbols to a bitstream by M-ary demapping the complex symbols extracted from the B2D communication resource. The B2D receive signal processor 410 can restore the data by decoding the bitstream.

The NB-baseband center frequency converter 412 shifts the frequency of the wideband signal output from the WB-RF processor 402. That is, the NB-baseband center frequency converter 412 shifts the frequency of the wideband signal such that the center frequency of the baseband D2D signal of the wideband signal is placed at the DC. For doing so, the NB-baseband center frequency converter 412 can shift the center frequency of the baseband D2D signal to the DC, based on the resource block offset of the resource block allocated for the D2D communication.

The NB-analog baseband processor 414 separates the baseband D2D signal from the frequency-shifted wideband signal, and enhances the signal quality according to the bandwidth of the baseband D2D signal. For example, the NB-analog baseband processor 414 can perform the band pass filtering corresponding to the narrowband, the analog filtering for eliminating the neighboring channel, the DC offset control, and the I/Q imbalance compensation. Through the analog filtering, the NB-analog baseband processor 414 can remove the D2B signal transmitted from the neighboring terminal.

The NB-ADC 416 converts the narrowband analog D2D signal to the digital signal. For example, the NB-ADC 416 can sample the analog D2D signal at the frequency corresponding to two times of the bandwidth of the D2D signal.

The NB-digital baseband processor 418 demodulates the SC-OFDM symbol or the OFDM symbol and extracts the complex symbols mapped to the resource blocks. That is, the NB-digital baseband processor 418 demodulates the SC-OFDM symbol or the OFDM symbol, that is, converts the symbol to the complex symbols of the frequency axis according to the modulation scheme of the SC-OFDM symbol or the OFDM symbol generated by the transmitter.

The D2D receive signal processor 420 demodulates and decodes the D2D signal. That is, the D2D receive signal processor 420 can convert the complex symbols to the bitstream by M-ary demapping the complex symbols extracted from the D2D communication resource. The D2D receive signal processor 420 can restore the D2D data by decoding the bitstream.

Although it is not depicted in FIG. 4, the receiver can further include a controller for selecting the signal processing path based on a type of the receive signal, for controlling the modules of the selected path, and for providing the RF offset. The controller can include at least one DSP and may be implemented as any suitable form of hardware.

Referring to FIG. 4, the NB-analog baseband processor 414, the NB-ADC 416, the NB-digital baseband processor 418, and the D2D receive signal processor 420 process only the D2D signal. However, part of the NB-analog baseband processor 414, the NB-ADC 416, the NB-digital baseband processor 418, and the D2D receive signal processor 420 can be omitted, and the function of the omitted block can be conducted by the module for the D2B signal.

Figure 5:
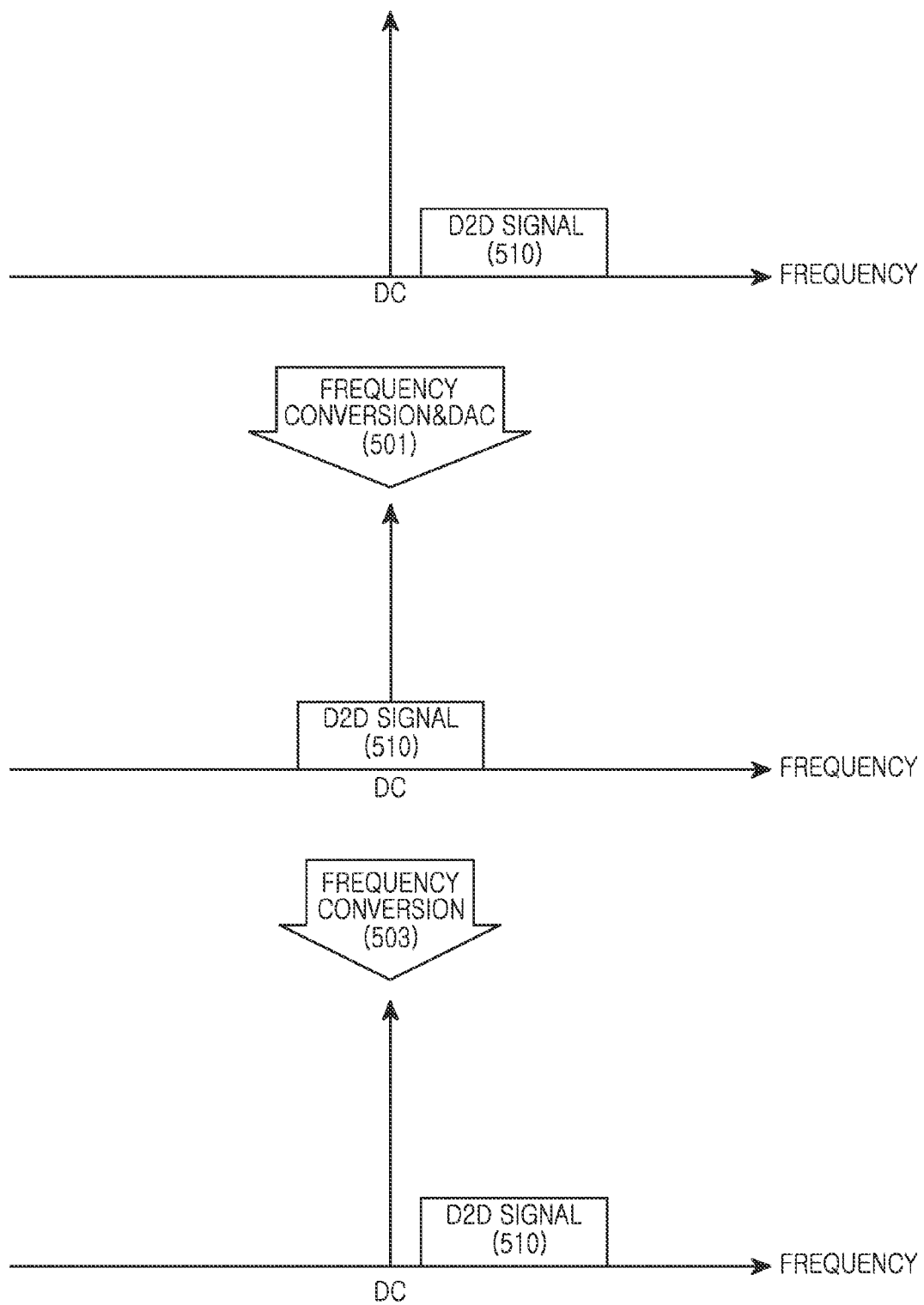
FIG. 5 illustrates spectral change of a transmit signal in a wireless communication system according to an embodiment of the present disclosure.

FIG. 5 illustrates spectral change of a transmit signal in a wireless communication system according to an embodiment of the present disclosure.

Referring to FIG. 5 a change of a D2D signal 510 according to the signal processing in the transmitter is depicted. After D2D traffic is generated, the D2D signal 510 is mapped to the D2D resource region allocated for the D2D communication. The D2D signal 510 is a digital baseband signal.

Next, the D2D signal 510 is converted to a DC-centered signal through the frequency conversion and the DAC is performed in operation 501. The DAC and the analog filter being the analog elements can be efficiently designed for the DC-centered signal. Hence, to increase the processing efficiency of the D2D signal 510, the transmitter frequency-shifts the D2D signal 510 by considering the frequency offset of the D2D allocation resource. Since the frequency-shifted D2D signal 510 is the narrowband signal of the bandwidth corresponding to the D2D resource based on the DC, the D2D signal 510 is converted to the analog signal through the narrowband DAC. Thus, the transmitter can process the narrowband analog signal.

Next, before the RF processing, the D2D signal 510 is frequency-converted in operation 503. That is, the transmitter re-shifts the frequency of the DC-centered D2D signal 510 by the frequency offset of the D2D resource. Hence, the analog-processed D2D signal 510 can be transmitted over the resource allocated for the D2D communication.

Figure 6:
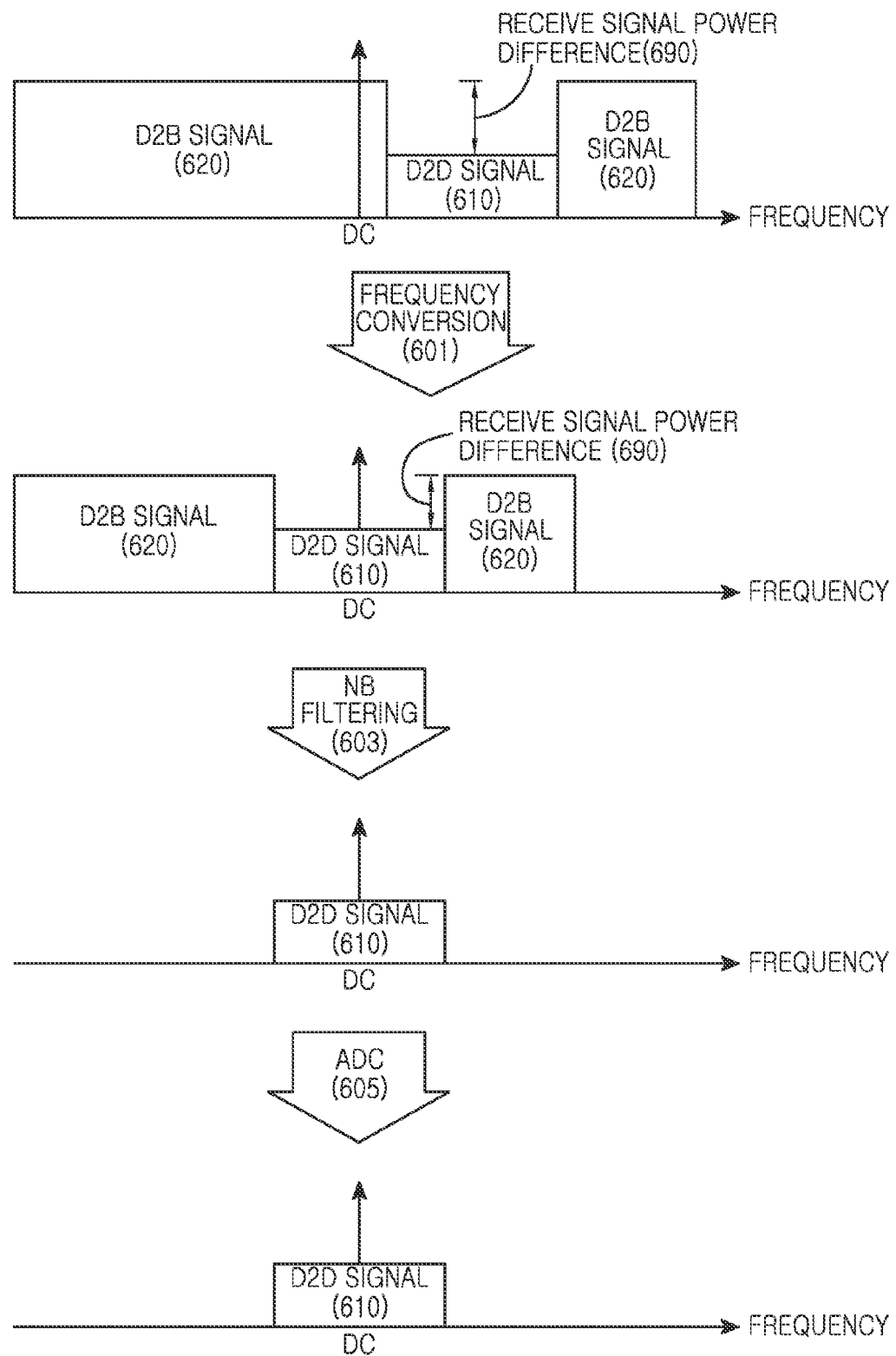
FIG. 6 illustrates spectral change of a receive signal in a wireless communication system according to an embodiment of the present disclosure.

FIG. 6 illustrates spectral change of a receive signal in a wireless communication system according to an embodiment of the present disclosure.

Referring to FIG. 6 the change of a D2D signal 610 according to the signal processing in the receiver is depicted. The wideband receive signal, including the D2D signal 610 and a D2B signal 620, is received. That is, when the receiver receives the D2D signal 610 through a wideband RF processing means, e.g., the WB-RF processor 402 of FIG. 4, the spectrum of the signal transmitted from another terminal to the base station can be adjacent to the spectrum of the D2D signal 610. In this case, when the power difference between the receive signals is considerable, great receive signal power difference 690 can occur. When a wideband receiver is used according to the conventional method, the receive signal power difference 690 increases quantization error and thus the performance degrades. By contrast, the present receiver can prevent the performance degradation by processing the narrowband signal.

Next, the frequency conversion of operation 601 shifts the wideband receive signal on the frequency axis such that the D2D signal 610 becomes the DC-centered signal. That is, the D2D signal 610 is converted to the DC-centered signal. Next, the narrowband filtering of operation 603 filters only the D2D signal 610 in the wideband receive signal of the shifted frequency. In addition, the I/O imbalance compensation and the DC offset control can be applied. The ADC of operation 605 converts the filtered D2D signal 610 to a digital signal.

Figure 7:
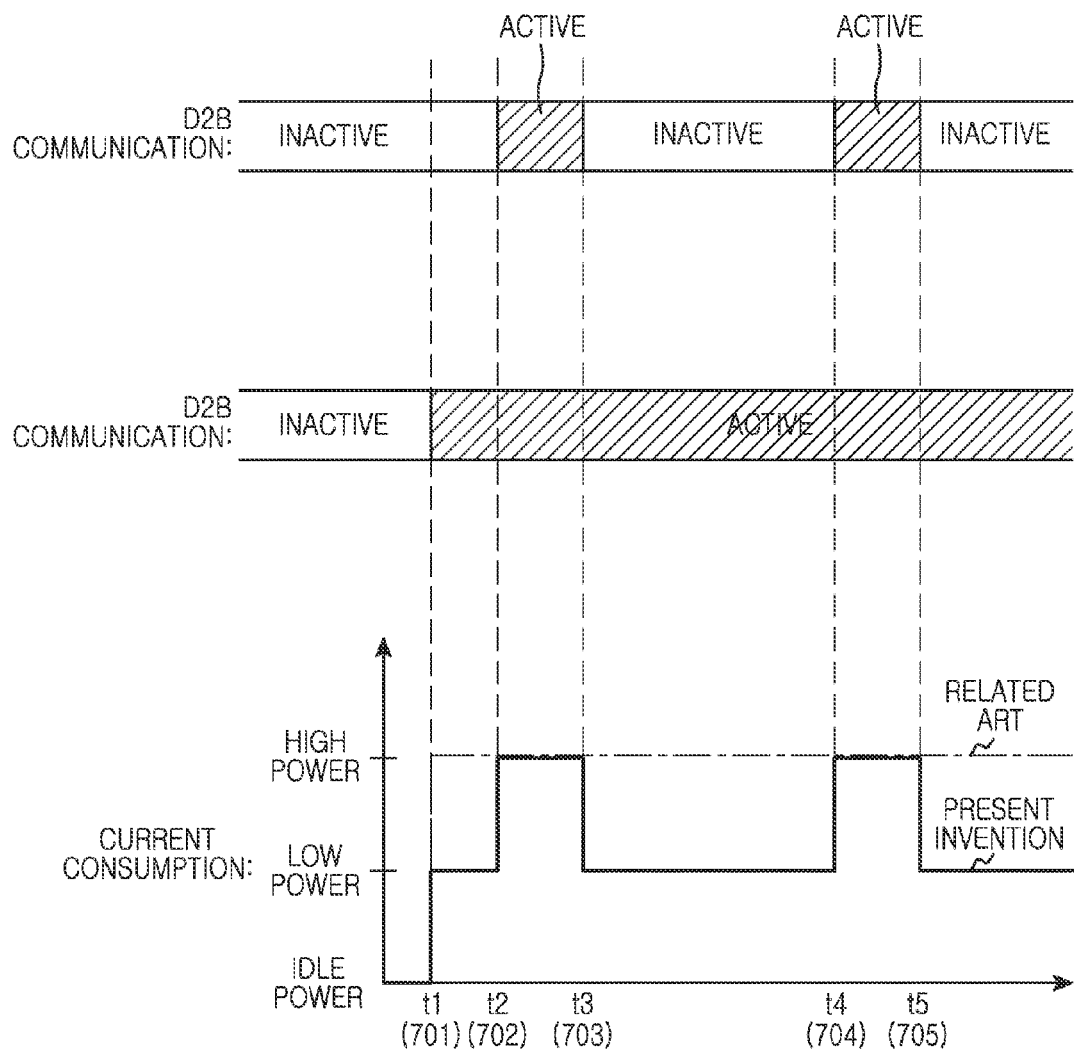
FIG. 7 illustrates current consumption change based on active D2D communication and D2B communication in a wireless communication system according to an embodiment of the present disclosure.

FIG. 7 illustrates current consumption change based on the active D2D communication and D2B communication in the wireless communication system according to an embodiment of the present disclosure.

Referring to FIG. 7, the current consumption change of the transmitter is depicted, and both of the D2D communication and the D2B communication are initially inactive. At t1 701, the D2D communication is activated. Since only the present modules for processing the narrowband signal operate, the current corresponding to the low power is consumed. By contrast, a related-art method operates the modules for processing the wideband signal and thus consumes the current corresponding to relatively the high power.

At t2 702, the D2B communication is activated. That is, both of the D2D communication and the D2B communication are active. Accordingly, the modules for processing the wideband signal operate and consume the current corresponding to the high power. While the current consumption increases compared to the D2D communication alone, the current similar to the related-art method is merely consumed.

At t3 703, the D2B communication is deactivated. That is, only the D2D communication is active. Naturally, the modules for processing the narrowband signal operate and consume the current corresponding to the low power. By contrast, the related-art method still consumes the current corresponding to the high power.

At t4 704, the D2B communication is activated. That is, both of the D2D communication and the D2B communication are active. Accordingly, the modules for processing the wideband signal operate and consume the current corresponding to the high power. While the current consumption increases compared to the D2D communication alone, the current similar to the related-art method is consumed.

At t5 705, the D2B communication is deactivated. That is, only the D2D communication is active. Naturally, the modules for processing the narrowband signal operate and consume the current corresponding to the low power. By contrast, the related-art method still consumes the current corresponding to the high power.

When the D2B communication and the D2B communication are conducted independently and their respective signals are transmitted, that is, when both of the D2D communication and the D2B communication are active, the transmitter consumes the current to process the transmit signal. By contrast, when no signal is transmitted, that is, when both of the D2D communication and the D2B communication are inactive, there is no current consumption for the transmit signal processing.

However, in both of the D2D communication and the D2B communication as shown in FIG. 7, the related-art method applies the wideband processing to both of the D2B signal and the D2D signal and thus consumes the current corresponding to high voltage in either case. By contrast, the present disclosure applies the narrowband signal processing to the D2D signal transmission and applies the wideband signal processing to the D2B signal transmission. Thus, the present D2D signal transmission, without the D2B signal transmission, can consume the relatively lower current than the related-art method.

As such, the transmitter and the receiver can include the signal processing modules for processing the D2D signal. In other words, the transmitter and the receiver can include the plurality of the signal processing modules for processing the signal of the same band. Yet, the bandwidth of the signal processed in those signal processing modules differs.

The separate signal processing modules for processing the D2D signal can increase the cost. Hence, the transmitter and the receiver of the present disclosure can reuse the signal processing modules designed for other purposes, or process the D2D signal using the signal processing modules designed for various purposes.

For example, in a 3GPP LTE system, the standard defines a plurality of system bandwidths. The system bandwidths and the number of the resource blocks of the 3GPP LTE system are shown in Table 1.

TABLE 1

| Bandwidth [MHz] | Transmission Bandwidth Configuration [$N_{RB}$] |
|---|---|
| 1.4 MHz | 6 |
| 3 MHz | 15 |
| 5 MHz | 25 |
| 10 MHz | 60 |
| 15 MHz | 75 |
| 20 MHz | 100 |

As shown in Table 1, the 3GPP LTE system defines 6 system bandwidths. Hence, in the design phase of the baseband signal processing modules for the LTE system, it is general to include a plurality of signal processing modules for the plurality of the system bandwidths so as to support various system bandwidths and to reconfigure the operating bandwidth in some cases. A plurality of signal processing modules can be equipped to support a Carrier Aggregation (CA) mode. When other standard systems than the LTE system includes a plurality of system bandwidths, they can include a plurality of signal processing module for the system bandwidths.

For example, while the system bandwidth is 10 MHz, the transmitter and the receiver can further include baseband signal processing modules for a 1.4 MHz system bandwidth. The baseband signal processing modules for the 1.4 MHz system bandwidth can be used to process the D2D signal. In this case, it is advantageous that the resource for the D2D communication is allocated within the maximum number of the resource blocks of 1.4 MHz. For example, the resource for the D2D communication can be allocated as the resource blocks corresponding to 1.4 MHz. Thus, it is possible to minimize the cost increase of the signal processing module for processing the D2D signal and to relatively reduce the increase of the terminal complexity.

For doing so, a node for allocating the resource for the D2D communication collects information about the baseband signal processing module of the D2D communication terminals, and allocates the D2D communication resource by considering the system bandwidth supportable by the baseband signal processing module. For example, the node for allocating the D2D communication resource can be the base station. For example, when the D2D communication terminal includes a module for supporting the 1.4 MHz system bandwidth in addition to the present system bandwidth, the base station allocates the resource blocks such that the D2D communication resource does not exceed the frequency range corresponding to 1.4 MHz. That is, in addition to the current system bandwidth, the base station allocates the bandwidth below the other supportable system bandwidth of the terminal.

Figure 8:
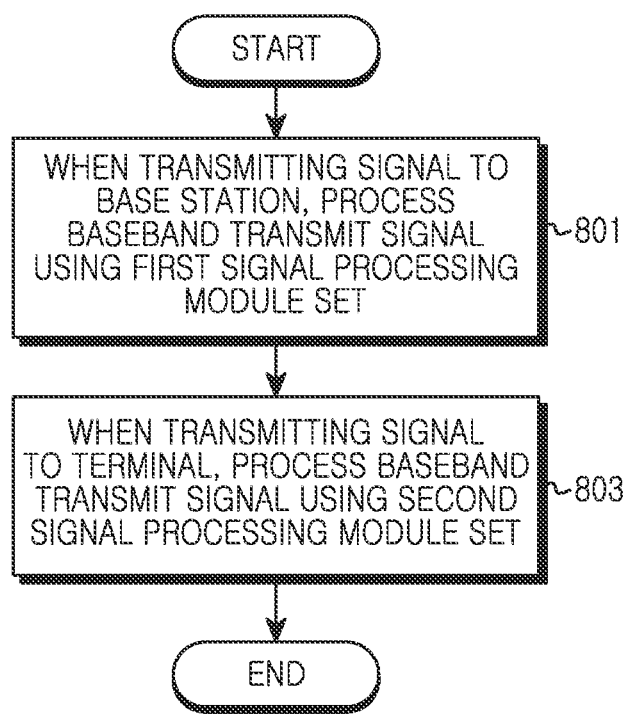
FIG. 8 illustrates operations of a transmitter in a wireless communication system according to an embodiment of the present disclosure.

FIG. 8 illustrates operations of a transmitter in a wireless communication system according to an embodiment of the present disclosure.

Referring to FIG. 8, when transmitting the signal to the base station, the transmitter processes the baseband transmit signal using a first signal processing module set in operation 801. That is, the transmitter generates the complex symbols by encoding and modulating uplink data to transmit to the base station using the first signal processing module set, generates the transmit signal including the complex symbols, converts the transmit signal to the analog signal, and then analog-processes the baseband. For example, the analog processing of the baseband can include at least one of the band pass filtering, the I/O imbalance compensation, and the DC offset compensation. For example, the first signal processing module set can include at least one signal processing module for processing a signal of a first bandwidth.

In operation 803, when transmitting the signal to the terminal, the transmitter processes the baseband transmit signal using a second signal processing module set. That is, the transmitter, as the terminal, can perform the D2D communication with another terminal. More specifically, the transmitter generates the complex symbols by encoding and modulating uplink data to transmit to the other terminal using the second signal processing module set, generates the transmit signal including the complex symbols, converts the transmit signal to the analog signal, and then analog-processes the baseband. For example, the analog processing of the baseband can include at least one of the band pass filtering, the I/O imbalance compensation, and the DC offset compensation. For example, the second signal processing module set can include at least one signal processing module for processing a signal of a second bandwidth. Herein, the second bandwidth is narrower than the first bandwidth. Namely, the maximum bandwidth of the signal processed by the first signal processing module set is relatively wider than the second signal processing module set. Hence, as processing the signal using the second signal processing module set, the electronic device consumes less current than the first signal processing module set. Alternatively, as processing the baseband transmit signal, the transmitter can fulfill part of the processing with the second signal processing module set and fulfill the remaining processing with the first signal processing module set. In so doing, the partial processing of the second signal processing module set can vary according to various embodiments of the present disclosure.

Although it is not depicted in FIG. 8, the transmitter can up-convert the signal, as processed by either the first signal processing module set or the second signal processing module set, to the RF signal and transmit the RF signal via at least one antenna.

Figure 9:
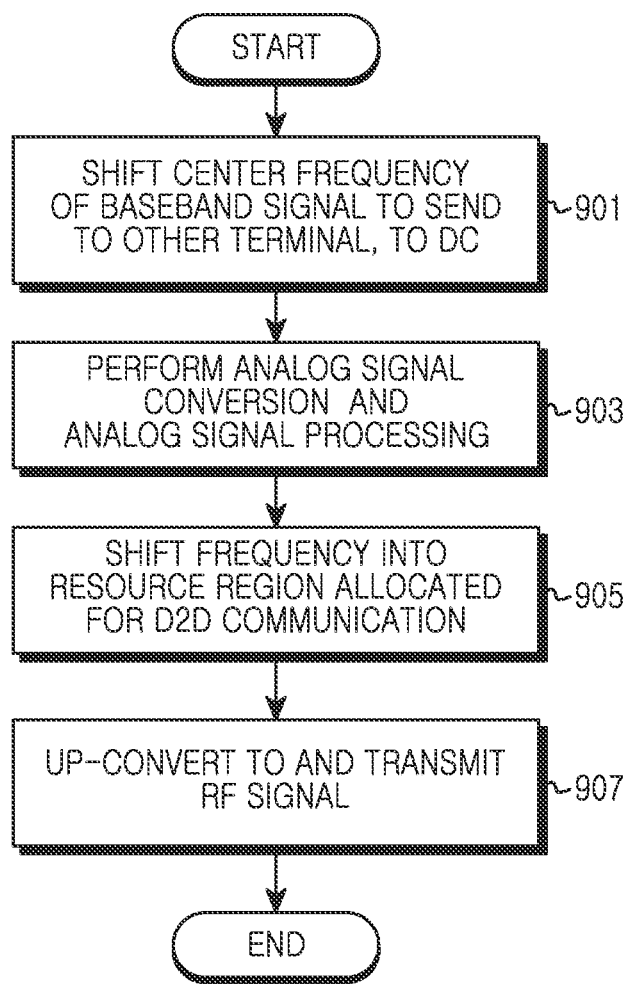
FIG. 9 illustrates operations of a transmitter in a wireless communication system according to another embodiment of the present disclosure.

FIG. 9 illustrates operations of a transmitter in a wireless communication system according to another embodiment of the present disclosure.

Referring to FIG. 9, the transmitter, as the terminal, can conduct the D2D communication with the other terminal, and the transmitter transmits the D2D signal to the other terminal. That is, the transmitter shifts the center frequency of the baseband signal to transmit to the other terminal to the DC in operation 901. The baseband signal to transmit to the other terminal, that is, the baseband D2D signal may not be DC-centered according to its location in the frequency of the resource block allocated for the D2D communication. In this case, the transmitter shifts the frequency such that the center frequency of the baseband D2D signal is placed at the DC. When the center of the resource blocks allocated for the D2D communication is already on the DC, operation 901 can be omitted.

In operation 903, the transmitter performs analog signal conversion to convert the baseband D2D signal to the analog signal and performs at least one analog signal processing to enhance the signal quality in operation 903. For example, the at least one analog signal processing includes at least one of the band pass filtering, the I/Q imbalance compensation, and the DC offset control. Hence, the transmitter can perform at least one of the analog signal conversion and the at least one analog signal processing using the signal processing module for the bandwidth narrower than the system bandwidth.

In operation 905, the transmitter shifts, and/or re-shifts, the frequency of the baseband D2D signal to the resource region allocated for the D2D communication. That is, in operation 905, the transmitter inversely shifts the frequency shifted in operation 903. Thus, the transmitter can transmit the D2D signal over the resource region allocated for the D2D communication. When the center of the resource blocks allocated for the D2D communication is on the DC, operation 905 can be omitted.

In operation 907, the transmitter up-converts the baseband D2D signal to the RF signal and transmits the signal to the other terminal via at least one antenna. When transmitting the D2D signal together with the update signal to the base station, the transmitter transmits the D2D signal and the uplink signal, that is, the D2B signal. Although it is not depicted in FIG. 9, at least one of the analog signal conversion of the D2B signal and the at least one signal processing can be performed by using the signal processing module for the bandwidth corresponding to the system bandwidth. Alternatively, when both of the D2D signal and the D2B signal are transmitted, the electronic device can process the baseband D2D signal together with the D2B signal using the signal processing module for the bandwidth corresponding to the system bandwidth.

Figure 10:
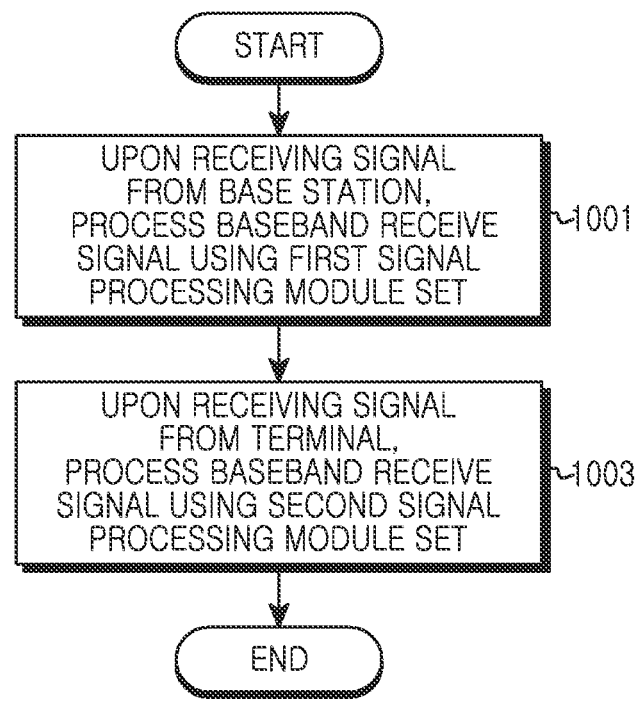
FIG. 10 illustrates operations of a receiver in a wireless communication system according to an embodiment of the present disclosure.

FIG. 10 illustrates operations of a receiver in a wireless communication system according to an embodiment of the present disclosure.

Referring to FIG. 10, when receiving the signal from the base station, the receiver processes the baseband receive signal using the first signal processing module set in operation 1001. That is, the receiver down-converts the RF signal received via at least one antenna, to the baseband signal, and analog-processes the baseband using the first signal processing module set. For example, the analog processing of the baseband can include at least one of the band pass filtering, the I/O imbalance compensation, the DC offset compensation, and digital compensation. For example, the first signal processing module set can include at least one signal processing module for processing the signal of the first bandwidth.

In operation 1003, upon receiving the signal from the terminal, the receiver processes the baseband receive signal using the second signal processing module set. That is, the receiver, as the terminal, can perform the D2D communication with other terminal. More specifically, the receiver down-converts the RF signal received from the other terminal via at least one antenna, to the baseband signal, and analog-processes the baseband using the second signal processing module set. For example, the analog processing of the baseband can include at least one of the band pass filtering, the I/O imbalance compensation, the DC offset compensation, and the digital conversion. For example, the second signal processing module set can include at least one signal processing module for processing the signal of the second bandwidth. Herein, the second bandwidth is narrower than the first bandwidth. Accordingly, as processing the signal using the second signal processing module set, the electronic device consumes less current than the first signal processing module set. Alternatively, as processing the baseband receive signal, the receiver can perform part of the processing with the second signal processing module set and fulfill the remaining processing with the first signal processing module set. In so doing, the partial processing of the second signal processing module set can vary according to various embodiments of the present disclosure.

Although it is not depicted in FIG. 10, the receiver can restore the data by demodulating and decoding the signal processed by the first signal processing module set or the second signal processing module set.

Figure 11:
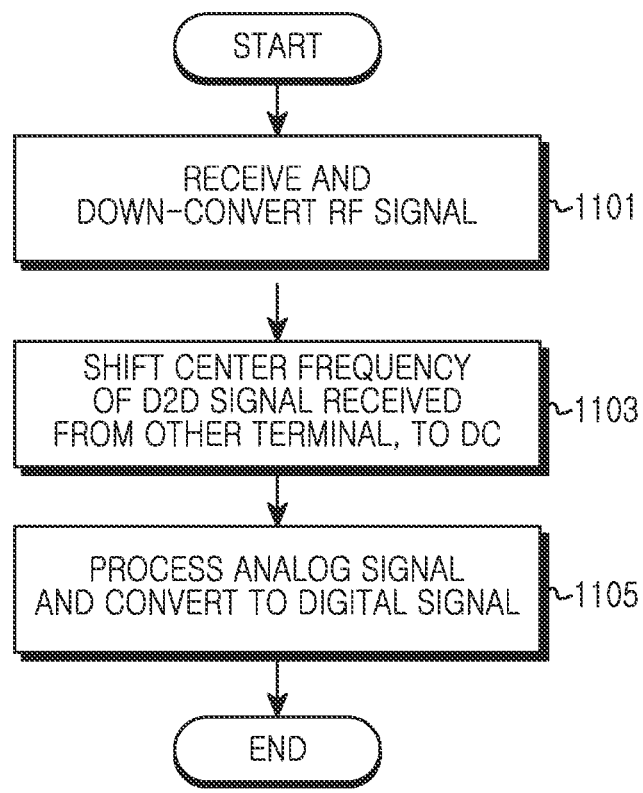
FIG. 11 illustrates operations of a receiver in a wireless communication system according to another embodiment of the present disclosure.

FIG. 11 illustrates operations of a receiver in a wireless communication system according to another embodiment of the present disclosure.

Referring to FIG. 11, the receiver, as the terminal, can conduct the D2D communication with the other terminal, and the receiver receives the D2D signal from another terminal. The receiver receives the RF signal via the at least one antenna and down-converts the RF signal in operation 1101. In other words, the receiver receives the D2D signal of the RF band and generates the baseband D2D signal by down-converting the D2D signal.

In operation 1103, the receiver shifts the center frequency of the D2D signal received from the other terminal, to the DC. That is, the receiver shifts the center frequency of the baseband D2D signal to the DC. The baseband D2D signal may not be DC-centered according to its location in the frequency of the resource block allocated for the D2D communication. In this case, the receiver shifts the frequency such that the center frequency of the baseband D2D signal is placed at the DC. When the center of the resource blocks allocated for the D2D communication is already on the DC, operation 1103 can be omitted.

In operation 1105, the receiver performs at least signal processing to process the analog signal, or in other words, to enhance the baseband D2D signal quality, and converts the signal to the digital signal. For example, the at least one signal processing includes at least one of the band pass filtering, the I/Q imbalance compensation, and the DC offset control. In so doing, the receiver can perform at least one of the at least one signal processing and the digital signal conversion, using the signal processing module for the bandwidth narrower than the system bandwidth.

Figure 12:
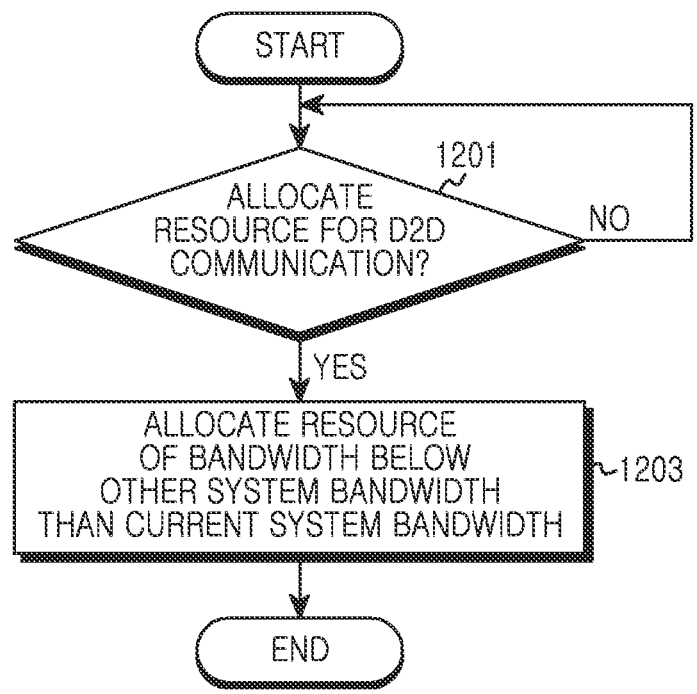
FIG. 12 illustrates operations of an apparatus for allocating a resource according to another embodiment of the present disclosure.

FIG. 12 illustrates operations of an apparatus for allocating a resource according to another embodiment of the present disclosure.

Referring to FIG. 12, the apparatus, which can be the base station, determines whether to allocate the resource for the D2D communication in operation 1201. For example, when the apparatus is the base station, the base station determines whether at least one terminal connected to the base station performs the D2D communication. The resource for the D2D communication can be allocated according to an explicit request and/or an implicit request of the at least one terminal, or according to the determination of the base station without the request.

To allocate the D2D communication resource, the apparatus allocates the resource of the bandwidth below other system bandwidth supportable by the at least one terminal than the current system bandwidth in operation 1203. That is, the terminal can include at least one baseband processing module for supporting the other system bandwidth than the current system bandwidth of its connected system. The other system bandwidth is wider than the current system bandwidth. Thus, the apparatus allocates the resource not to exceed the range corresponding to the other system bandwidth so that the terminal can use the at least one baseband processing module for supporting the other system bandwidth in the D2D signal processing. For example, when the other system bandwidth can include $N_{BW}$-ary resource blocks at maximum, the apparatus can allocate the resource blocks below $N_{BW}$, for the D2D communication.

Although it is not depicted in FIG. 12, the apparatus can generate a control message notifying the resource allocation result, and transmit the control message to the at least one terminal. For example, when the apparatus is the base station, the base station can transmit the control message to the at least one terminal through the B2D connection.

Figure 13:
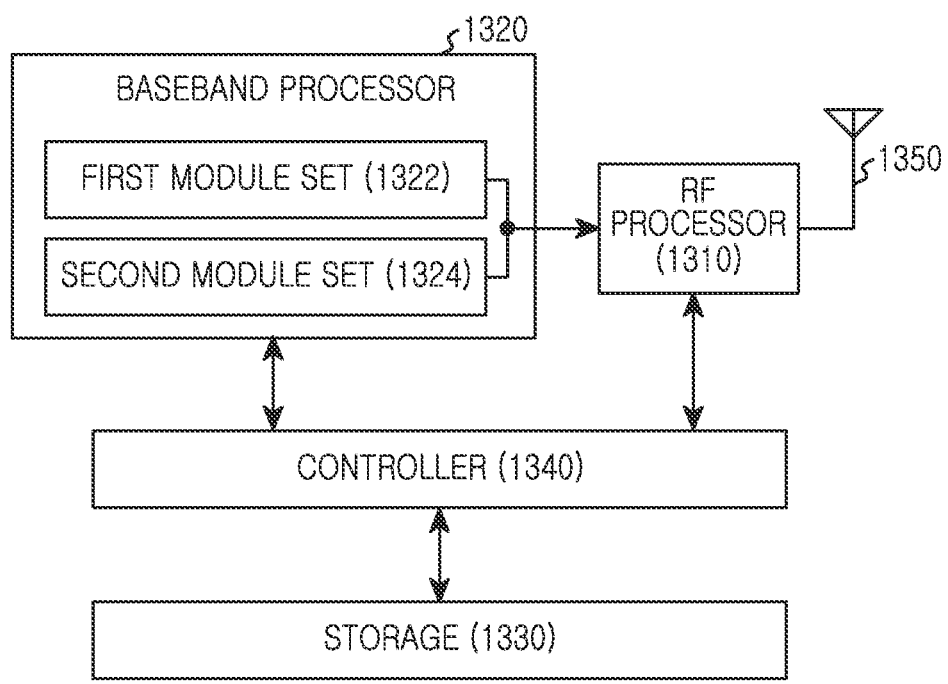
FIG. 13 illustrates a transmitter in a wireless communication system according to an embodiment of the present disclosure.

FIG. 13 is a block diagram of a transmitter in a wireless communication system according to an embodiment of the present disclosure.

Referring to FIG. 13, the transmitter includes an RF processor 1310, a baseband processor 1320, a storage 1330, and a controller 1340.

The RF processor 1310 transmits the signal over a radio channel through signal band conversion and amplification. That is, the RF processor 1310 up-converts the baseband signal fed from the baseband processor 1320 to the RF signal, and transmits the RF signal via an antenna 1350. For example, the RF processor 1310 can include an RF transmit filter, an amplifier, a mixer, and an oscillator. While the antenna 1350 is shown as a single antenna in FIG. 13, the transmitter can include a plurality of antennas. The RF processor 1310 can include a plurality of RF chains.

The baseband processor 1320 converts the baseband signal and the bitstream according to a physical layer standard of the system. For example, to transmit the data, the baseband processor 1320 generates the complex symbols by encoding and modulating the transmit bitstream, and performs the analog signal processing including the analog conversion and at least signal processing for the signal quality enhancement. In particular, the baseband processor 1320 includes a first module set 1322 for processing the signal of the first bandwidth and a second module set 1324 for processing the signal of the second bandwidth. That is, the bandwidths of the signal input to the first module set 1322 and the signal input to the second module set 1324 are different. Due to the different bandwidths of the signal input to the first module set 1322 and the signal input to the second module set 1324, the current quantity consumed by the first module set 1322 and the second module set 1324 can differ. Even with the same band of the transmit signal, the signal of the first bandwidth can be processed by the first module set 1322 and the signal of the second bandwidth can be processed by the second module set 1324. For example, the baseband processor 1320 can be constructed as shown in FIG. 3.

When processing the signal, the second module set 1324 shifts the center frequency of the signal to the DC, converts the signal to the analog signal, and performs the at least one signal processing to enhance the signal quality. The second module set 1324 re-shifts the signal so that the signal is placed in the resource region allocated for the signal transmission. Further, the second module set 1324 can encode and modulate the signal. Further, the second module set 1324 can perform at least one of the FFT and the IFFT in order to generate the SC-FDMA symbol or the OFDM symbol.

The second module set 1324 can be a signal processing unit designed to process the D2D signal. Alternatively, the second module set 1324 can be a signal processing unit for processing the signal of the other system bandwidth than the cellular system bandwidth of the connected terminal.

Alternatively, the second module set 1324 can perform at least one partial processing needed for the signal of the second bandwidth, and the first module set 1322 can perform the at least one other processing that is needed. For example, the second module set 1324 can encode, modulate, and analog-convert the signals of the different bandwidths, and the first module set 1322 can perform at least one of the band pass filtering, the I/O imbalance compensation, and the DC offset control on all of the signals of the different bandwidths. A specific range of the at least one partial processing performed by the second module set 1324 can vary according to various embodiments of the present disclosure.

The baseband processor 1320 and the RF processor 1310 transmit the signal as mentioned above. Hence, the baseband processor 1320 and the RF processor 1310 can be referred to as a transmitting part or a communication part.

The storage 1330 stores a basic program for operating the transmitter, an application program, and data, such as setup information. The storage 1330 provides the stored data according to a request of the controller 1340.

The controller 1340 controls the operations of the transmitter. For example, the controller 1340 controls the baseband processor 1320 and the RF processor 1310 to transmit the signal. In particular, the controller 1340 controls to transmit the signal via either the first module set 1322 or the second module set 1324 according to the type, for example, the bandwidth of the transmit signal. That is, the controller 1340 can select the module set for processing the signal from the first module set 1322 and the second module set 1324 according to the D2D signal of the narrowband or the D2B signal of the wideband. For example, the controller 1340 can control the transmitter to fulfill the method of FIG. 8 or FIG. 9.

Figure 14:
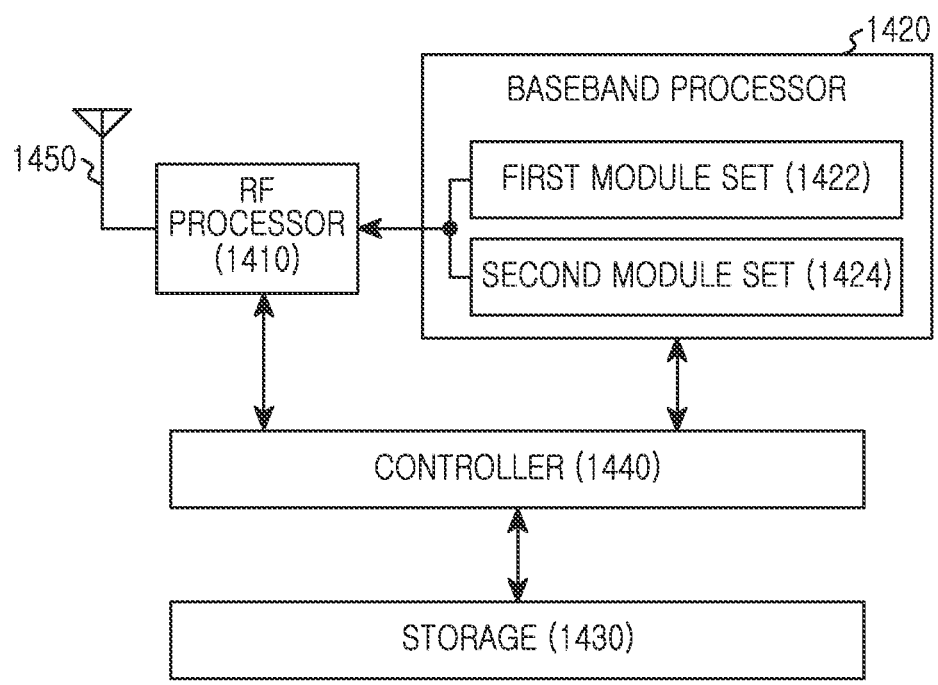
FIG. 14 illustrates a receiver in a wireless communication system according to an embodiment of the present disclosure.

FIG. 14 is a block diagram of a receiver in a wireless communication system according to an embodiment of the present disclosure.

Referring to FIG. 14, the receiver includes an RF processor 1410, a baseband processor 1420, a storage 1430, and a controller 1440.

The RF processor 1410 receives the signal over the radio channel through the signal band conversion and the amplification. That is, the RF processor 1410 down-converts the RF signal received via an antenna 1450 to the baseband signal. For example, the RF processor 1410 can include an RF transmit filter, an amplifier, a mixer, and an oscillator. While the antenna 1450 is shown in FIG. 14 as a single antenna, the receiver can include a plurality of antennas. The RF processor 1410 can include a plurality of RF chains.

The baseband processor 1420 converts the baseband signal and the bitstream according to the physical layer standard of the system. For example, when receiving the data, the baseband processor 1420 performs at least one signal processing for enhancing the signal quality and the analog signal processing including the digital conversion, and restores the bitstream by demodulating and decoding the signal. In particular, the baseband processor 1420 includes a first module set 1422 for processing the signal of the first bandwidth and a second module set 1424 for processing the signal of the second bandwidth. That is, the bandwidths of the signals input to the first module set 1422 and the second module set 1424 are different. Due to the different bandwidths of the signal processed by the first module set 1422 and the signal processed by the second module set 1424, the current quantity consumed by the first module set 1422 and the second module set 1424 can differ. Even with the same band of the receive signal, the signal of the first bandwidth can be processed by the first module set 1422 and the signal of the second bandwidth can be processed by the second module set 1424. For example, the baseband processor 1420 can be constructed as shown in FIG. 4.

When processing the signal, the second module set 1424 shifts the center frequency of the signal to the DC. The second module set 1424 performs the at least one signal processing to enhance the signal quality and converts the signal to the digital signal. Further, the second module set 1424 can demodulate and decode the signal. Further, the second module set 1424 can perform at least one of the FFT and the IFFT in order to demodulate the SC-FDMA symbol or the OFDM symbol.

The second module set 1424 can be a signal processing unit designed to process the D2D signal. Alternatively, the second module set 1424 can be a signal processing unit for processing the signal of the other system bandwidth than the cellular system bandwidth of the connected terminal.

Alternatively, the second module set 1424 can perform at least one partial processing needed for the signal of the second bandwidth, and the first module set 1422 can perform the at least one other processing that is needed. For example, the first module set 1422 can perform at least one of the band pass filtering, the I/O imbalance compensation, and the DC offset control on all of the first bandwidth signal including the second bandwidth signal, and the second module set 1424 can digital-convert, demodulate, and decode the second bandwidth signal. A specific range of the at least one partial processing performed by the second module set 1424 can vary according to various embodiments of the present disclosure.

The RF processor 1410 and the baseband processor 1420 receive the signal as stated above. Hence, the RF processor 1410 and the baseband processor 1420 can be referred to as a receiving part or a communication part.

The storage 1430 stores a basic program for operating the receiver, an application program, and data such as setup information. The storage 1430 provides the stored data according to a request of the controller 1440.

The controller 1440 controls the operations of the receiver. For example, the controller 1440 controls the baseband processor 1420 and the RF processor 1410 to receive the signal. In particular, the controller 1440 controls either the first module set 1422 or the second module set 1424 to process the signal according to the type, for example, the bandwidth of the receive signal. That is, the controller 1440 can select the module set for processing the signal from the first module set 1422 and the second module set 1424 according to the D2D signal of the narrowband or the D2B signal of the wideband. For example, the controller 1440 can control the receiver to fulfill the method of FIG. 10 or FIG. 11.

Figure 15:
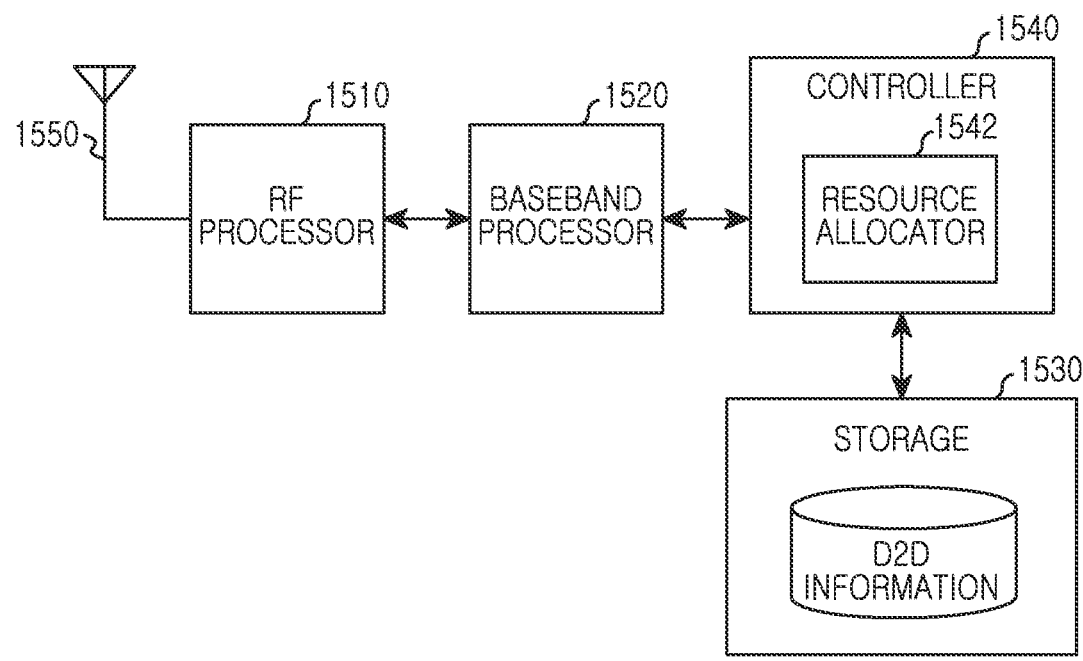
FIG. 15 illustrates an apparatus for allocating a resource in a wireless communication system according to another embodiment of the present disclosure.

FIG. 15 is a block diagram of an apparatus for allocating a resource in the wireless communication system according to another embodiment of the present disclosure.

Referring to FIG. 15, the apparatus, which can be the base station, includes an RF processor 1510, a baseband processor 1520, a storage 1530, and a controller 1540.

The RF processor 1510 transmits and receives the signals over a radio channel through the signal band conversion and the amplification. That is, the RF processor 1510 up-converts the baseband signal fed from the baseband processor 1520 to the RF signal, transmits the RF signal via an antenna 1550, and down-converts the RF signal received via the antenna 1550 to the baseband signal. While the antenna 1550 is shown as a single antenna in FIG. 15, the apparatus can include a plurality of antennas. The RF processor 1510 can include a plurality of RF chains. Further, the RF processor 1510 can form a beam. For the beamforming, the RF processor 1510 can adjust phase and magnitude of the signals transmitted and received via a plurality of antennas and/or antenna elements.

The baseband processor 1520 converts the baseband signal and the bitstream according to the physical layer standard of the system. For example, to transmit the data, the baseband processor 1520 generates the complex symbols by encoding and modulating the transmit bitstream. When receiving the data, the baseband processor 1520 restores the receive bitstream by demodulating and decoding the baseband signal fed from the RF processor 1510. For example, for the data transmission according to the OFDM, the baseband processor 1520 generates the complex symbols by encoding and modulating the transmit bitstream, maps the complex symbols to subcarriers, and generates the OFDM symbols using the IFFT and Cyclic Prefix (CP) addition. When receiving the data, the baseband processor 1520 splits the baseband signal fed from the RF processor 1510 to the OFDM symbols, restores the signals mapped to the subcarriers using the FFT, and restores the receive bitstream by demodulating and decoding the signals. The baseband processor 1520 and the RF processor 1510 transmit and receive the signals as stated above. Hence, the baseband processor 1520 and the RF processor 1510 can be referred to as a transmitting part, a receiving part, a transceiving part, or a communication part.

The storage 1530 stores a basic program for operating the apparatus, an application program, and data such as setup information. Particularly, the storage 1530 can store D2D communication information. The D2D communication information can include D2D communication terminal information, and channel quality information between the D2D communication terminals. The storage 1530 provides the stored data according to a request of the controller 1540.

The controller 1540 controls the operations of the apparatus. For example, the controller 1540 transmits and receives the signal via the baseband processor 1520 and the RF processor 1510. In particular, the controller 1540 records and reads the data to and from the storage 1530. The controller 1540 includes a resource allocator 1542 for allocating the D2D communication resource. For example, the controller 1540 can control the apparatus to perform the method of FIG. 12. The controller 1540 operates as follows according to an embodiment of the present disclosure.

As allocating the D2D communication resource, the controller 1540 allocates the resource of the bandwidth below the other system bandwidth supportable by the at least one terminal rather than the current system bandwidth. That is, the terminal can include at least one baseband processing module for supporting the other system bandwidth than the current system bandwidth of the base station. The controller 1540 allocates the resource not to exceed the range corresponding to the other system bandwidth so that the terminal can use the at least one baseband processing module supporting the other system bandwidth in the D2D signal processing. The controller 1540 generates the control message notifying the resource allocation result, and transmits the control message to the at least one terminal via the baseband processor 1540 and the RF processor 1510.

As set forth above, the D2B communication signal of the wideband and the separate signal processing modules are used for the D2D communication signal of the narrowband, to thus prevent the unnecessary current consumption.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of a first terminal in a wireless communication system, the apparatus comprising:
    a first baseband processor configured to generate an uplink signal by processing a first data to be transmitted to a base station and operate at a first frequency; and
    a second baseband processor for a second bandwidth, configured to generate a device-to device (D2D) signal by processing a second data to be transmitted to a second terminal and operate at a second frequency that is lower than the first frequency,
    wherein the second bandwidth is narrower than a first bandwidth for the first data processed by the first baseband processor, and
    wherein the second baseband processor is further configured to:
        perform at least one signal processing on a signal regarding the second data, wherein a center frequency of the signal regarding the second data is shifted to direct current (DC) based on an offset of resource blocks that are allocated for the second data, and generate the D2D signal by shifting a center frequency of the processed signal to the resource blocks.

2. The apparatus of claim 1, further comprising:
    a radio frequency (RF) processor configured to generate an RF signal based on at least one of the uplink signal and the D2D signal; and
    an antenna configured to transmit the RF signal.

3. The apparatus of claim 1, wherein the at least one signal processing comprises a conversion from a digital to an analog signal.

4. The apparatus of claim 1, further comprising:
    a controller configured to, when transmitting the uplink signal to the base station and another D2D signal to the second terminal in a same time interval, determine whether the first baseband processor processes both the first data to be transmitted to the base station and another data to be transmitted to the second terminal or not, based on a difference between a power of the uplink signal and a power of the another D2D signal.

5. The apparatus of claim 1, wherein the second baseband processor comprises at least one module configured to process a third signal having another system bandwidth other than a system bandwidth of a cellular system used by a connection to the base station.

6. The apparatus of claim 1,
    wherein the D2D signal is transmitted over a resource allocated within the second bandwidth, and
    wherein each of the first bandwidth and the second bandwidth is a system bandwidth defined by a standard adopted by a cellular system.

7. An apparatus of a first terminal in a wireless communication system, the apparatus comprising:
    a first baseband processor configured to generate a first data by processing a downlink signal received from a base station and operate at a first frequency; and
    a second baseband processor for a second bandwidth configured to generate a second data by processing a device-to-device (D2D) signal received from a second terminal and operate at a second frequency that is lower than the first frequency,
    wherein the second bandwidth is narrower than a first bandwidth for the downlink signal processed by the first baseband processor, and wherein the second baseband processor is further configured to:
  shift a center frequency of the D2D signal to direct current (DC) based on an offset of resource blocks that are allocated for the second data, and
  perform at least one signal processing on the shifted D2D signal.

8. The apparatus of claim 7, further comprising:
an antenna configured to receive a radio frequency (RF) signal; and
an RF processor configured to transmit the RF signal to at least one of the first baseband processor or the second baseband processor.

9. The apparatus of claim 7, wherein the at least one signal processing comprises a conversion from an analog signal to a digital signal.

10. The apparatus of claim 7, wherein the second baseband processor comprises at least one module configured to process a third signal having another system bandwidth other than a system bandwidth of a cellular system used by a connection to the base station.

11. The apparatus of claim 7,
wherein the D2D signal is received over a resource allocated within the second bandwidth, and
wherein each of the first bandwidth and the second bandwidth is a system bandwidth defined by a standard adopted by a cellular system.

12. An apparatus of a base station for allocating a resource in a wireless communication system, the apparatus comprising:
a controller configured to allocate the resource to carry a device-to-device (D2D) signal from a first terminal to a second terminal,
wherein the resource is allocated within a first system bandwidth defined by a standard adopted by a cellular system,
wherein the first system bandwidth is narrower than a second system bandwidth of the cellular system used by a connection between the first terminal and the base station,
wherein a center frequency of the D2D signal is shifted to direct current (DC), when performing a narrowband signal processing, based on an offset of a resource block region that is allocated for the D2D signal, and
wherein a first frequency used for the narrowband signal processing is lower than a second frequency used for a wideband processing for the connection between the first terminal and the base station.

13. The apparatus of claim 12, wherein the first terminal comprises a first baseband processor for the first system bandwidth and a second baseband processor for the second system bandwidth.

14. A method for operating a first terminal in a wireless communication system, the method comprising:
if transmitting a first data to a base station, generating an uplink signal by processing the first data by using a first baseband processor operating at a first frequency; and
if transmitting a second data to a second terminal, generating a device-to-device (D2D) signal by processing the second data by using a second baseband processor operating at a second frequency for a second bandwidth, the second frequency being lower than the first frequency,
wherein the second bandwidth is narrower than a first bandwidth for the first data processed by the first baseband processor, and
wherein the generating of the D2D signal comprises:
  performing at least one signal processing on a signal regarding the second data, wherein a center frequency of the signal regarding the second data is shifted to direct current (DC) based on an offset of resource blocks that are allocated for the second data, and
  generating the D2D signal by shifting a center frequency of the processed signal to the resource blocks.

15. The method of claim 14, further comprising:
generating a radio frequency (RF) signal based on at least one of the uplink signal and the D2D signal; and
transmitting the RF signal.

16. The method of claim 14, wherein the at least one signal processing comprises a conversion from a digital signal to an analog signal.

17. The method of claim 14, further comprising, when transmitting the uplink signal to the base station and another D2D signal to the second terminal in a same time interval, determining whether the first baseband processor processes both the first data to be transmitted to the base station and another data to be transmitted to the second terminal or not, based on a difference between a power of the uplink signal and a power of the another D2D signal.

18. The method of claim 14, further comprising:
processing a third signal having another system bandwidth other than a system bandwidth of a cellular system used by a connection to the base station by using at least one module in the second baseband processor.

19. The method of claim 14,
wherein the D2D signal is transmitted over a resource allocated for within the second bandwidth, and
wherein each of the first bandwidth and the second bandwidth is a system bandwidth defined by a standard adopted by a cellular system.

20. A method for operating a first terminal in a wireless communication system, the method comprising:
if receiving a downlink signal from a base station, generating a first data by processing the downlink signal by using a first baseband processor that operates at a first frequency; and
if receiving a device-to-device (D2D) signal from a second terminal, generating a second data by processing the D2D signal by using a second baseband processor, that operates at a second frequency, which is lower than the first frequency, for a second bandwidth,
wherein the second bandwidth is narrower than a first bandwidth for the downlink signal processed by the first baseband processor, and
wherein the generating of the second data comprises:
  shifting a center frequency of the D2D signal to direct current (DC) based on an offset of resource blocks that are allocated for the second data, and
  performing at least one signal processing on the shifted D2D signal.

21. The method of claim 20, further comprising:
receiving a radio frequency (RF) signal; and
transmitting the RF signal to at least one of the first baseband processor or the second baseband processor.

22. The method of claim 20, wherein the at least one signal processing comprises a conversion from an analog signal to a digital signal.

23. The method of claim 20, wherein the second baseband processor comprises at least one module for processing a third signal having another system bandwidth other than a system bandwidth of a cellular system used by a connection to the second terminal.

24. The method of claim 20,
wherein the D2D signal is received over a resource allocated within the second bandwidth, and
wherein each of the first bandwidth and the second bandwidth is a system bandwidth defined by a standard adopted by a cellular system.

25. A method for operating a base station for allocating a resource in a wireless communication system, the method comprising:
allocating the resource to carry a device-to-device (D2D) signal from a first terminal to a second terminal,
wherein the resource is allocated within a first system bandwidth defined by a standard adopted by a cellular system,
wherein the first system bandwidth is narrower than a second system bandwidth of the cellular system used by a connection between the first terminal and the base station,
wherein a center frequency of the D2D signal is shifted to direct current (DC), when performing a narrowband signal processing, based on an offset of a resource block region that is allocated for the D2D signal, and
wherein a first frequency used for the narrowband signal processing is lower than a second frequency used for a wideband processing for the connection between the first terminal and the base station.

26. The method of claim 25, wherein the first terminal comprises a first baseband processor for the first system bandwidth and a second baseband processor for the second system bandwidth.

* * * * *